UNITED STATES PATENT OFFICE.

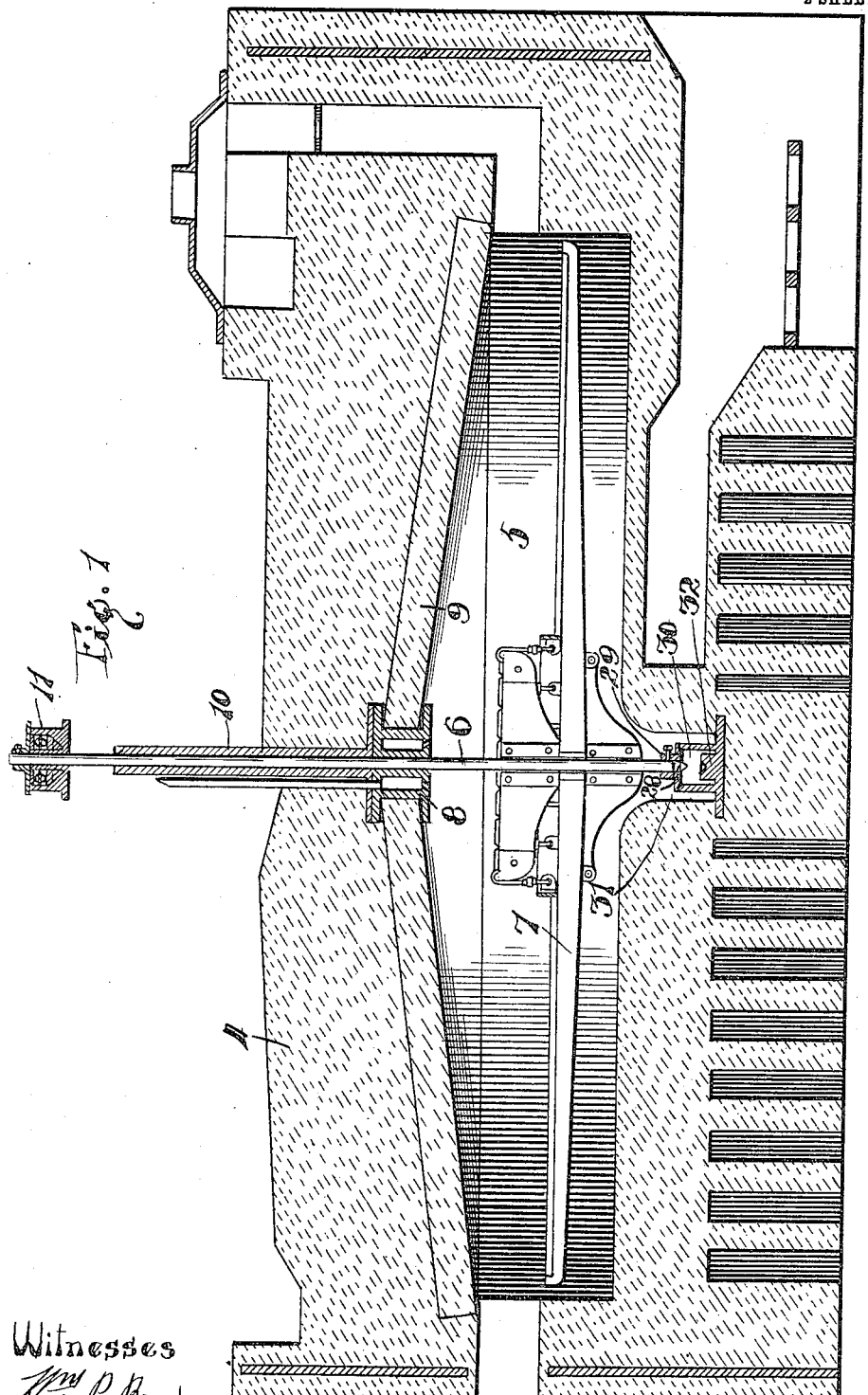

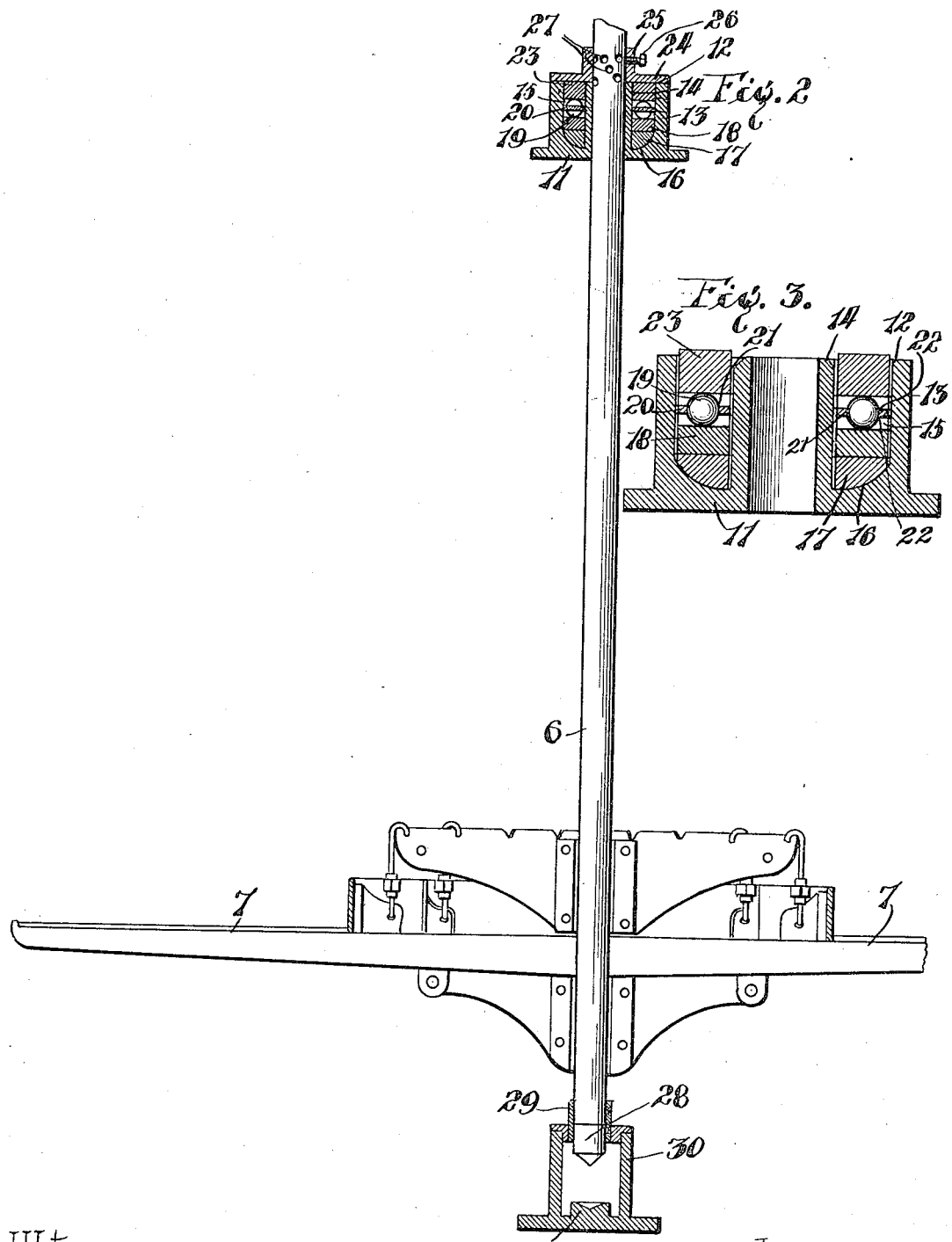

FREDERICK R. BARNHEISEL, OF CHICAGO, ILLINOIS.

ROTARY BEARING FOR SUSPENDED SHAFTS.

961,670. Specification of Letters Patent. Patented June 14, 1910.

Original application filed October 17, 1905, Serial No. 283,121. Divided and this application filed January 22, 1907. Serial No. 353,484.

*To all whom it may concern:*

Be it known that I, FREDERICK R. BARNHEISEL, a citizen of the United States, residing at Chicago, in the county of Cook and State of Illinois, have invented certain new and useful Improvements in Rotary Bearings for Suspended Shafts, of which the following is a specification, the same being a division of application, Serial No. 283,121, filed October 17, 1905.

The present invention relates to mounting and supporting a vertically suspended shaft by means of a specially constructed bearing located at a point easy of access for lubricating the bearings and for the purpose of repair or adjustment; and in providing a step or lower bearing for emergency use, when the upper bearing is inoperative, so that the ordinary use of the shaft will not be prevented.

The invention further relates to the construction of the upper bearing, by which an oil cup is provided for lubricating purposes, and also to the means for adjusting the vertical position of the shaft within the bearing.

The invention consists in the features of construction and combination of parts hereinafter described and claimed.

The bearing is specially applicable for use in supporting the shaft of a rotary baking plane, and is so illustrated in the drawings for the purpose of showing the invention in one form of use, with a vertically suspended shaft.

In the drawings Figure 1 is a longitudinal sectional elevation of a rotary bake oven showing the method of supporting the shaft; Fig. 2 an enlarged view of the rotary shaft, bearing and baking plane; and Fig. 3 an enlarged detail of the bearing cup.

The bearing and supporting mechanism is shown in connection with a bake oven 4, which may be of any suitable character, having therein a cylindrical baking chamber 5. Through the center of the baking chamber extends a vertical shaft 6 which supports a circular baking table 7. Since the particular shape and construction of the baking table forms no part of the present invention, it is not deemed necessary to give a detailed description of the same. The shaft passes through a crown casting 8 in the center of the roof 9 of the baking chamber and through an upwardly extending tubular sleeve 10. The rotary shaft is hung from a bearing 11 suitably supported above the oven, and said bearing consists of a casing 12 having an outer wall 13 and an inner wall 14 forming an annular oil cup 15, the bottom 16 of which is dished and serves as a socket for a leveling washer 17, which is rounded on its lower face to conform to the gravity of the dished bottom of the annular oil chamber. Above the leveling washer is a lower bearing ring 18 of hardened steel, which serves as a trackway for a series of balls 19, which are held in place by means of a ring plate 20 having circular holes 21 of proper diameter to embrace the balls, and the upper and lower edges 22 of the holes are inwardly crimped or forced to hold the ring in position with respect to the balls entered therethrough. An upper bearing 23 is located upon and movable with the upper set of balls and projects slightly above the walls of the annular oil cup and serves as a support for a plate 24 having a hub 25 which is rigidly mounted on the shaft and is held in place by means of a set screw 26. The shaft is provided with a series of holes 27 arranged in staggered relation around the outer face of the shaft, in any one of which the set screw is adapted to be entered for regulating the vertical position of the shaft.

The lower end of the shaft is provided with a cone bearing 28 of hardened steel, which bearing is encircled and held in place by a collar 29, and the bearing as a whole is mounted within a casing 30 located within a well 31 in the center of the floor of the baking chamber, which casing 30 is provided in its center with a concave step 32 adapted to receive the point of the cone bearing when the shaft is lowered.

The construction of the socket is one which provides a method of easily and constantly lubricating the bearings by the provision of an oil cup, within which a lubricant can be poured. At the same time the lubricant is outside of and away from the baking chamber, so that no fumes or odors which might impair the baking product can enter into the baking chamber. The concave shape of the bearing socket and the provision of the leveling washer serve to maintain the bearing surface true at all times, and this is important in view of the fact that the load supported by the shaft will serve to hold the shaft in a vertical position at all times, whereby it is highly essential that the bearing surfaces be maintained in a horizontal position in order to prevent binding or friction. The provision of the lower step serves to maintain the shaft against any swinging or vibration, and serves as a support for the shaft in the case of emergency, and permits its rotation so that the operation of the oven will not be impaired or seriously obstructed by accidents to the regular bearings. By suspending the shaft in the manner indicated, it is possible to adjust the vertical position of the shaft and baking plane carried thereby to a very considerable degree, which would be impossible if the shaft were supported from below in the usual manner. The arrangement is much more convenient and satisfactory in all respects than the ordinary method of mounting a shaft of this character.

While the advantages and utility of the bearing for suspended shafts of the present invention have been pointed out, particularly with reference to supporting a rotary baking plane, it is to be understood that the use of such bearing is not confined to a baking plane, as the bearing is adapted for use and intended for use with suspended rotatable shafts generally.

What I claim as new and desire to secure by Letters Patent is:

1. In a bearing for suspended shafts, the combination of a rotatable vertical shaft, a casing having an annular channel and surrounding the shaft, a series of rotatable members located within the annular channel of the casing, bearing rings within the channel one above and one below the rotatable members, a plate rigidly secured to the shaft and resting on the upper bearing ring and suspending the shaft, a plane horizontally extending from and carried by and rotatable with the shaft, and a step bearing below the lower end of the suspended shaft serving as an emergency bearing for suspending the shaft, substantially as described.

2. In a bearing for suspended shafts, the combination of a rotatable vertical shaft, a casing having an annular channel and surrounding the shaft, a series of rotatable members located within the annular channel of the casing, bearing rings within the channel one above and one below the rotatable members, a plate rigidly secured to the shaft and resting on the upper bearing ring and suspending the shaft, a plane horizontally extending from and carried by and rotatable with the shaft, a cone at the lower end of the shaft, and a step bearing below the cone for supporting the shaft from below when lowered, substantially as described.

3. In a rotary bearing for suspended shafts, the combination of a rotatable vertical shaft, a casing having an annular channel dished at its bottom and surrounding the shaft, a leveling washer shaped to conform to the dish of the bottom of the annular channel, a plurality of balls within the annular channel, bearing rings one above and one below the balls, a flange rigidly secured to the shaft and resting on the upper bearing ring and suspending the shaft, a plane horizontally extending from and carried by and revoluble with the shaft, a cone at the lower end of the shaft, and a step bearing below the cone for supporting the shaft from below when lowered, substantially as described.

FREDERICK R. BARNHEISEL.

Witnesses:
WALKER BANNING,
WILLIAM H. AIKEN.